A. BUHL.
Apparatus for Scouring Wheat.
No. 237,478. Patented Feb. 8, 1881.
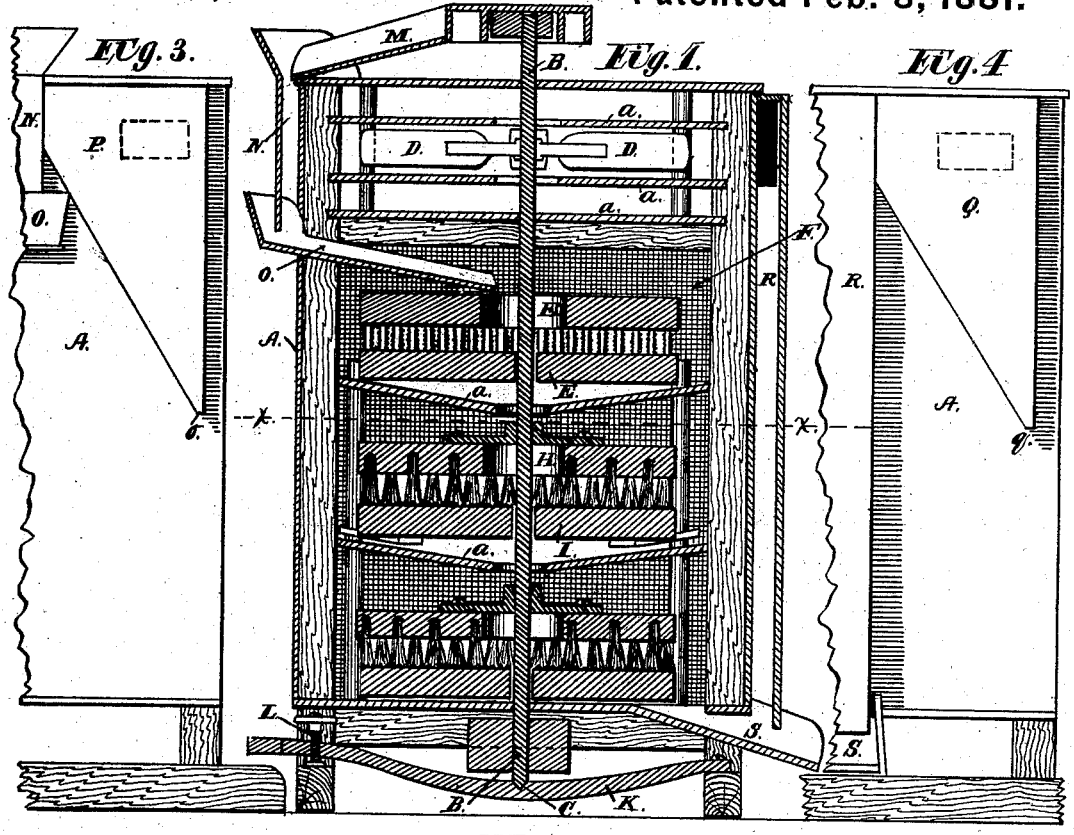
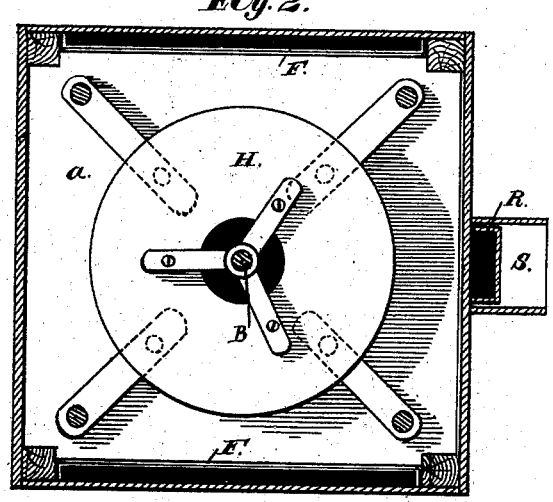

UNITED STATES PATENT OFFICE.

ANTHONY BUHL, OF DAYTON, OHIO.

APPARATUS FOR SCOURING WHEAT.

SPECIFICATION forming part of Letters Patent No. 237,478, dated February 8, 1881.

Application filed August 16, 1878.

*To all whom it may concern:*

Be it known that I, ANTHONY BUHL, of Dayton, in the county of Montgomery and State of Ohio, have invented certain new and useful Improvements in Wheat-Scourers; and I do hereby declare the following to be a full, clear, and exact description of the same.

This invention has relation to grain-scourers; and it consists in the improved features of construction and combination hereinafter fully described, and particularly pointed out in the claim.

A A is the inclosing-case, being an upright box closed at the top, sides, and bottom. Passing all the way up through central apertures in the top and bottom of this casing, and projecting above and below, is a vertical shaft, B, supported beneath by the step-socket C. The apertures in the casing through which this shaft passes are of a proper size to permit it to revolve easily without wabbling. The interior of the casing A is divided by a series of partition-plates or diaphragms, *a*, into several compartments or chambers. In the uppermost of these chambers, and inclosed in a tight box therein, is a fan, D, consisting of radial vanes secured to the shaft B and revolving with it. The opening in the bottom of this chamber for the passage of the shaft should fit as snugly about the latter as is consistent with its free rotation. The openings in the center of the two diaphragms forming the tight box should be of such a size as to admit the air freely, and yet to cause a current or draft to be drawn from the surrounding chamber by the revolution of the fan. In the next chamber below that in which is inclosed the tight box, secured to the shaft B and rotating with it, is a scouring-wheel, E, consisting of the parallel disks connected by numbers of short pins. The interior opposing faces of these disks, as also the short pins, are coated with grit or sandstone to give them a rasping-surface. The eye of the upper disk is of a size to allow the grain flowing from the spout O to pass readily down between the scouring-faces, while the lower disk hugs the shaft B closely and permits no grain to pass through, the arrangement and construction in this particular being like that of an ordinary set of millstones. The bottom of this chamber is funnel-shaped, descending at a moderate inclination from its sides to its center, the better to act as a hopper to conduct the grain by its own weight to the compartment below. For this purpose its central aperture is large enough to allow the grain to flow through without choking. In the next chamber below is a second decorticating-wheel, consisting of two independent parts, the upper part or runner being a circular brush, H, secured to the driving-shaft B and revolving with it, and the lower part or bed-stone being a friction-disk, I, coated with grit and supported immovably upon arms extending from the sides or corners of the frame-work or casing. The brush H receives the grain through its eye from the apartment above, while the motionless disk I fits snugly around the driving-shaft. The bristles of the brush should not be too stiff or harsh, but should be pliant enough to scrape and rasp the grain without crushing the kernel. The bottom of this chamber is formed just like that of the chamber above and acts as a hopper to the apartment below. The wheel in the bottom chamber is like the one just described, the stationary friction-disk resting on the bottom of the casing, and the brush secured to the shaft and revolving over the face of the bed-stone. The several partition-plates are preferably supported from the corners or sides of the casing. Across the bottom of the casing, on the outside, extends the bridge-tree K, being a bar of wood or metal of size and strength sufficient to support the driving-shaft B, with the fan, the brushes, and the wheel E attached. This bar is hinged at one end to a cross-beam of the frame, while its other end, through which passes the lighter-screw L, rests upon the opposite beam. At the center of this bridge-tree is a socket or step, in which rests the toe of the driving-shaft.

On the inner face of each of two opposite walls of the casing, and at a little distance from them, so as to leave a space between, is secured a sheet of wire-gauze, F. This gauze extends all the way across the faces of these walls, and from their bottom up to the floor of the topmost chamber, there ceasing, so as to open into that chamber. The edges of intervening partitions abut against this gauze jacket on these two sides without extending through it to the walls of the casing. Thus on these two sides there is an uninterrupted open space from the bottom of the casing to the floor of the topmost chamber. On the top of the casing is the screening-trough M, one end of which rests upon or loosely embraces an eccentric on the driving-shaft, so as to vibrate with the revolutions of the latter, while its other end discharges into the chute N on the outside face of the casing. This chute extends down as far as the first hulling-chamber, and then opens into the inclined trough O, which, in turn, discharges into the eye of the scouring-wheel in that chamber.

At one side of the chute N, and opening into it, is the tailings-chamber P, Fig. 3, of the general shape shown. At its bottom this chamber has a small vent, o. At its top it is closed; but at the upper inside corner it opens into the fan-chamber at a point above and outside of the tight box in said chamber.

At the diagonally-opposite corner of the casing, and on the ouside, is a similar chamber, Q, Fig. 4, opening into the fan-chamber, and also at one side into the conduit R. This conduit extends from the top of the casing, where it is closed, except with the above-named opening, to the bottom, where it opens into the spout S, and forms a draft or suction passage from said spout to the chamber Q.

The spout S is the discharge-outlet from the lowest hulling-chamber to the outside of the casing.

The operation of my improved huller and cleaner is as follows: Motion is communicated in any suitable way to the driving-shaft B to set it revolving. When the machine is thus in motion the grain is first delivered into the screening-trough M. The vibrations of this trough, caused by the rotation of its eccentric bearing on the shaft, screens out the heavier and coarse dirt mixed with the grain and discharges the latter into the chute N. While passing down this chute the current created by the rapid revolution of the fan D in its close chamber draws still more of the cheat and dirt up into the chamber P, whence the heavier and coarser parts fall down and escape through the vent o, while the lighter particles are drawn into the fan-chamber, and escape thence in the usual way. The grain is received from the chute N into the inclined trough O, which delivers it into the eye of the wheel E. Here it begins the first step in the process of hulling, being tossed about by the motion of the wheel against the rasping-surfaces of the disks and their connecting-pins. There being no exit at the center of the lower disk, the grain finds its way by centrifugal force to the periphery and falls over upon the hopper-diaphragm below, whence it is delivered at the center into the eye of the wheel below. Here it is subjected to the action of the brushes rubbing against the roughened surface of the stationary friction-disk below, and is again discharged at the circumference, travels down the partition-plate to its center, and passes into the wheel below, where it is subjected to the same process as that just described, and is swept in the usual way into the vent-spout S and passes out in a hulled state.

To change the distance between the scouring-brushes and the motionless friction-disks, in order to regulate the degree of scouring or adjust them to grain of different sizes, the shaft B is raised or lowered by means of the lighter-screw L, this action raising or lowering the brushes without moving the friction-disks. As the grain passes out hulled at the spout S the bran and other, lighter stuff is drawn up by the exhaust-current of the fan-blast through the draft-passage R and discharged into the outlet-chamber Q, whence it escapes at the vent q. The bran and foreign matter are still further separated from the kernel by exhaust acting through the space between the wire-gauze F and the walls of the case, drawing them through the gauze into said space, whence they escape in the usual way.

In the accompanying drawings, Figure 1 is a central sectional view, in elevation, of my improved machine. Fig. 2 is a sectional plan view through the line x x of Fig. 1. Figs. 3 and 4 are end elevations of portions of the opposite ends.

I am aware that stationary scouring-disks and revolving brushes are not new; also, that pins rising from a revolving stone have been arranged to rake between pins depending from an upper stationary stone, as in Patent No. 8,739, of February 17, 1852; and, also, that wire-gauze is commonly used in scouring-machines; and I desire only to claim the construction herein shown and described.

Having thus described my invention, I claim as follows:

In a grain-scourer, the horizontally-revolving wheel E, composed of the upper stone, having central eye and a grit-coated under face, and the lower stone, having a grit-coated upper face, secured to the upper stone by the short grit-coated connecting-pins, in the manner and for the purpose substantially as described.

Witness my hand this 14th day of December, A. D. 1877.

ANTHONY BUHL.

Witnesses:
P. H. GUNCKEL,
CHAS. M. PECK.